W. A. DITTMAN.
STEERING GEAR FOR AUTOMOBILES.
APPLICATION FILED DEC. 5, 1914.
1,162,988.
Patented Dec. 7, 1915.
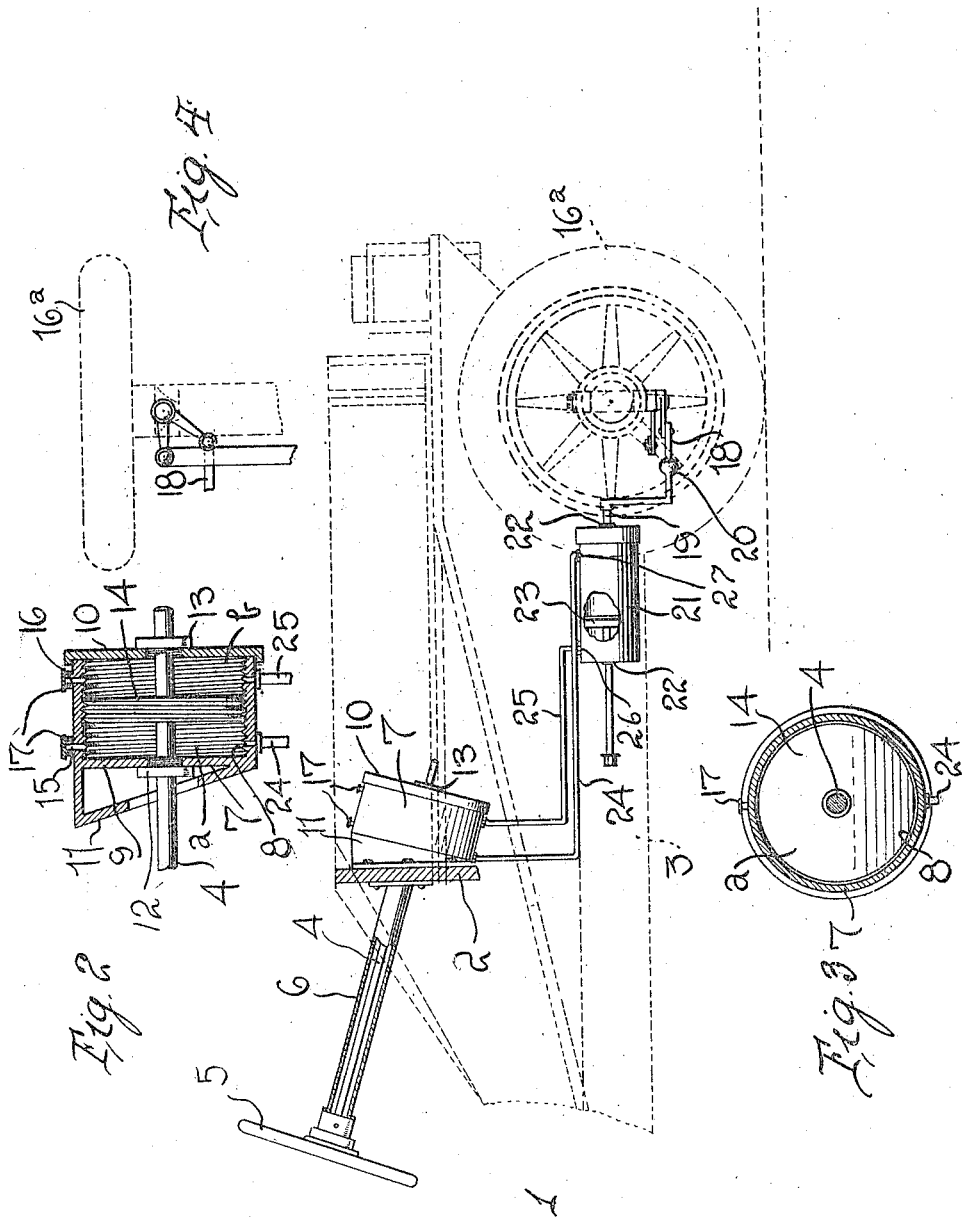
Witnesses
Robert M. Sutphen
A. I. Hind
Inventor
WALTER A. DITTMAN
By Watson E. Coleman
Attorney

UNITED STATES PATENT OFFICE.

WALTER A. DITTMAN, OF DRYDEN, MICHIGAN.

STEERING-GEAR FOR AUTOMOBILES.

1,162,988.  Specification of Letters Patent.  Patented Dec. 7, 1915.

Application filed December 5, 1914. Serial No. 875,712.

*To all whom it may concern:*

Be it known that I, WALTER A. DITTMAN, a citizen of the United States, residing at Dryden, in the county of Lapeer, and State of Michigan, have invented certain new and useful Improvements in Steering-Gears for Automobiles, of which the following is a specification, reference being had to the accompanying drawings.

My invention relates to automobiles, or like power driven vehicles, and particularly to the steering gear therefor.

In the steering gear ordinarily found in automobiles and other power driven vehicles, the front wheels are actuated by a shaft having a worm engaging a worm gear operatively connected to the front wheels of the automobile, and in practice it is found that the front wheels are not held or locked in their steering positions, but that they will cause a continual oscillation of the steering wheel, thus at least on a rough road, the driver of the automobile has always to exert considerable strength in order to hold the steering wheel in its adjusted position against the action of the road on the front traction wheels.

The main object of my invention is to obviate this difficulty by providing a means for directing the steering traction wheels of the machine, said means being so constructed that jolts or jars coming against the wheels will not tend to rotate the steering wheels on the steering post.

A further object of the invention is to so construct the steering gear that the traction wheels will be shifted for steering movement by a fluid medium which is forced in one direction or the other direction by means of a piston directly connected to and controlled by the steering post and wheel thereon.

A further object of the invention is to provide means for urging the fluid medium above referred to in one direction or the other comprising a rotatable piston mounted upon the steering post having screw threaded engagement with a cylinder whereby the rotation of the post will cause the piston to move longitudinally of the cylinder in one direction or the other.

Other objects will appear in the course of the following description.

My invention is illustrated in the accompanying drawings, wherein—

Figure 1 is a side elevation of an automobile in dotted lines, showing my invention in full lines as applied thereto, the dashboard, sleeve 6 and cylinder 21 being partly broken away; Fig. 2 is a longitudinal section of the cylinder 7 with the piston therein; Fig. 3 is a transverse section of Fig. 2; Fig. 4 is a plan view in dotted lines, of an automobile wheel and axle, showing in full lines the knuckle and steering arm of the wheel.

Corresponding and like parts are referred to in the following description and designated in all parts of the accompanying drawings by like reference numerals.

Referring to these drawings, 2 designates the dashboard of an automobile, and 3 a portion of the frame of the vehicle. Projecting through the dashboard is the steering shaft 4 carrying a steering wheel 5 at its upper end and rotatably mounted in a sleeve or post 6. It is to be understood of course, that the steering wheel and post and its mounting may be of any ordinary or usual type. Disposed upon the outer side of the dashboard is a cylinder 7 closed at both ends, the circumferential wall of the cylinder being interiorly screw threaded as at 8. Preferably the cylinder has an integral end wall 9 and a detachable end wall 10, and the cylinder is held in place upon the dashboard by means of any suitable bracket or support 11. The end wall 9 is formed with a gland 12 through which the steering shaft 4 passes, and the end wall 10 is also formed with a gland 13 to receive and guide the extremity of the shaft 4. Mounted upon this shaft 4 is the piston 14, which may be of any suitable construction and which is exteriorly screw threaded so as to engage with the screw threads 8. It will be obvious, therefore, that upon a rotation of the shaft 4 and piston 14 the piston will move in one direction or the other axially of the sleeve 7, depending upon the direction of rotation of the steering wheel 5.

It will be seen that the piston divides the cylinder into two chambers, designated *a* and *b*. The circumferential wall or cylinder is provided with two inlet openings 15 and 16, opening respectively into the chambers or spaces *a* and *b*, these inlet openings being closed by suitable caps 17. These inlet openings permit oil or other fluid medium to be filled into the spaces *a* and *b*.

The traction wheel 16 has the usual steering arm 18 which is operatively connected to a piston rod 19. As illustrated, the piston rod 19 is cranked or offset at one end and is connected to the arm 18 by means of a universal joint 20, but I do not wish to be limited to this detailed construction, as it is obvious that the exact formation of the rod 19 and its connection to the rod 18 will depend upon the particular make of car to which my device is applied and upon the location of the cylinder 21 within which the piston rod 19 operates. The cylinder 21 is closed at both ends, is formed in any suitable manner, and is provided at its ends with glands 22 through which passes the piston rod 19. This rod 19 carries upon it any suitable piston 23, this piston being shown as formed in two sections with an intermediate packing.

Extending from the space *a* of the cylinder 7 is a pipe or conductor 24 which opens into one end of the cylinder 21, while extending from the space *b* is a pipe 25 which opens into the other end of the cylinder 21. The ports 26 and 27 of these pipes 24 and 25 are spaced from each other such a distance in relation to the movement of the rod 19 that the piston 23 will not at all times pass beyond these ports 26 and 27. It will be noted that these ports 26 and 27 are contracted relative to the area of the piston 23, and that the ports leading to the pipes 24 and 25 are also relatively contracted in area to the area of the piston 14.

The spaces *a* and *b*, the pipes 24 and 25, and the space on each side of the piston 23 are intended to be filled with oil or other fluid medium, but oil is preferable.

It will be obvious now that a rotation of the shaft 4 in one direction will cause the movement of the piston 14 toward one end of the cylinder 7, thus compressing the oil on that side and forcing it through the corresponding pipe 24 or 25 and forcing it into the space between one end of the cylinder 21 and the piston, thereby forcing the piston in one or the other direction and carrying with it the rod 19 and correspondingly shifting the steering wheel. Thus when the steering wheel 5 is turned in a clockwise direction the piston 14 will be forced down, forcing the oil into the space *c* behind the piston 23 and urging the piston 23 forward, the oil in front of the piston passing out through the pipe 24 and into the space *a*. A counter-clockwise movement of the lever 5 will retract the piston, forcing the oil into the space in front of the piston 23 and withdrawing the oil from the space behind the piston. Any shock or jar communicated to the wheels 16 will of course be communicated to the piston 14 in a manner to cause a rotation of the piston, which will be held from movement by its engagement with the screw threads on the wall 7 of the main cylinder. Furthermore, inasmuch as a fluid medium is provided between the actuating piston and the piston 23, it is obvious that shocks or jars communicated to the steering wheels will be cushioned to some extent by the fluid medium.

It will be obvious that the power required to shift the piston 14 will be relatively slight and that the force exerted upon the fluid medium will be derived from the engagement of the piston 14 with the screw threads, thus a relatively small force applied to the steering wheel will create relatively considerable power transmitted from the piston 14 to the piston 23 by means of the fluid medium.

It is obvious that this mechanism may be applied to any car of ordinary type, and that the details of construction may be varied to suit the particular arrangement and construction of the car. It is also obvious that while I have described my mechanism as applicable particularly to motor vehicles, it might also be applied to the steering of vessels, in which case the piston 19 will be operatively connected with the rudder. In this case also the shocks communicated to the rudder would not be transmitted to the helmsman, as the steering wheel would not be subjected to the shocks to which it is subjected at the present time.

Having described my invention, what I claim is:

1. In a steering gear of the character described, a rotatably controlled steering shaft carrying a piston thereon, a main cylinder within which the piston operates and through the end of which the steering shaft passes, a rotation of the shaft causing the axial movement of the shaft and of the piston within said cylinder, a fluid containing chamber, a piston therein having a piston rod, the space on each side of the last named piston being connected respectively to the space on each side of the piston in the main cylinder, whereby fluid in said chamber may pass to or from the spaces in the main cylinder, and a steerable member operatively connected to said piston rod.

2. In a steering gear of the character described, a rotatably controlled steering shaft carrying a piston, the periphery of which is externally screw threaded, a main cylinder through one end of which the steering shaft passes interiorly screw threaded to receive said piston and closed at its ends, whereby a rotation of the shaft and piston will cause an axial movement of the piston, a fluid chamber, a piston therein having a piston rod, the space on each side of the piston in this cylinder being connected to the spaces on each side of the piston in the main cylinder, whereby to permit fluid to pass to or from said spaces in the main cylinder into or from the spaces in the fluid chamber, and a steerable member operatively connected to the piston rod.

3. In a steering gear of the character described, a rotatably controlled steering shaft carrying a piston, the periphery of which is externally screw threaded, a cylinder into which the steering shaft passes and within which the piston operates having interior screw threads engaged with the piston, the ends of the cylinder being closed, an auxiliary cylinder a piston therein having a piston rod projecting through the cylinder, the pipes connecting the space on each side of the first named piston to the space on each side of the second named piston, the rod carried by the second named piston being adapted to be connected to a member to be actuated, and the cylinders and pipes being filled with a fluid medium.

4. In an automobile, a dashboard, a main cylinder mounted thereon and being internally screw threaded and closed at its ends, a steering shaft passing into the cylinder having an actuating handle, a piston carried upon the shaft, external screw threads engaging with the walls of the cylinder, a cylinder mounted upon the frame of the machine, a piston therein having a piston rod projecting through the cylinder, a traction wheel operatively connected to said piston rod to be shifted thereby, tubular connections between the opposite ends of the second named cylinder, and a fluid medium disposed in both of said cylinders and said tubular connections, the first named cylinder being provided with means whereby fluid may be filled into the cylinders and tubular connections.

5. In a steering mechanism of the character described, a fluid cylinder having spaced outlets, the cylinder being closed at its ends, a steering shaft passing into one end of the cylinder and carrying an operating handle at its extremity and concentric to the cylinder, a piston carried by said shaft, screw threaded means for causing rectilinear movement of the piston in the cylinder upon the rotation of said shaft, and pressure operating steering wheel actuated means operatively connected to the outlets of the fluid cylinder.

In testimony whereof I hereunto affix my signature in the presence of two witnesses.

WALTER A. DITTMAN.

Witnesses:
ALBERT DITTMAN,
CHAS. R. FERGUSON.